No. 682,171. Patented Sept. 10, 1901.
R. W. CARTTER.
STERILIZER.
(Application filed Feb. 6, 1901.)
(No Model.)

Witnesses
Inventor
Richard W. Cartter
By Webster, Tafts & Tilley
Attorneys

UNITED STATES PATENT OFFICE.

RICHARD W. CARTTER, OF WEST SPRINGFIELD, MASSACHUSETTS.

STERILIZER.

SPECIFICATION forming part of Letters Patent No. 682,171, dated September 10, 1901.

Application filed February 6, 1901. Serial No. 46,257. (No model.)

*To all whom it may concern:*

Be it known that I, RICHARD W. CARTTER, a citizen of the United States of America, residing at West Springfield, in the county of Hampden and State of Massachusetts, have invented a new and useful Sterilizer, of which the following is a specification.

My invention relates to a sterilizer for soil, consisting, essentially, of a perforated steam receptacle or receptacles covered with material which is pervious to steam, but practically impervious to soil or other substances acted upon.

The objects of my improvement are to provide an improved appliance for sterilizing soil, vegetable matter, fertilizer, and the like which is simple and inexpensive in construction and with which the work of sterilization can be performed more quickly and thoroughly than heretofore. In order to kill the germs or microbes in soil and other matter employed particularly in hothouses and for market-gardening purposes which destroy plant life, it is necessary to heat said soil to a temperature of 210° or thereabout. This heating is commonly done in a pit remote from the locality where the soil is to be finally placed, which necessitates much hard labor and consumes considerable time.

The best method of procedure and best apparatus I consider to be that set forth in the following description, and I attain the objects of my invention by the means illustrated in the accompanying drawings, in which—

Figure 1:
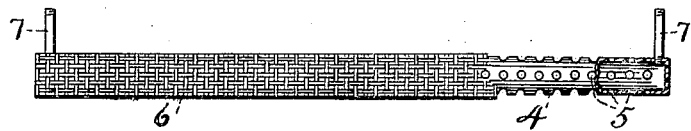
Figure 2:
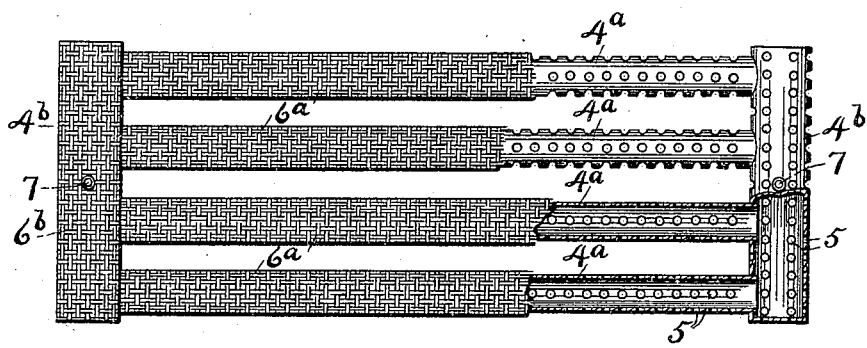

Figure 1 is a side view, in partial section, of the simplest form of my sterilizer; Fig. 2, a top view, in partial section, of the preferred form of my construction; and Fig. 3, an isometric view, in partial section, of a modified form of construction.

Similar figures refer to similar parts throughout the several views.

Referring first to Fig. 1, it will be seen that a steam receptacle or tube 4, closed at both ends, is provided with the holes 5 in its sides and ends, said tube being coated or covered with the jacket 6, of burlap or other coarse fabric, preferably. The steam-inlet pipes 7 7 rise from the tube 4, near the ends thereof, and these pipes are connected in practice with a steam-generating apparatus. (Not shown in the drawings.)

In Fig. 2 a sterilizer is made up of a plurality of tubes $4^a$, similar to the tubes 4, except that the ends of the former are open, and of the larger end tubes $4^b$ $4^b$, into which said tubes $4^a$ open. The tubes $4^a$ and $4^b$ are provided with the holes 5, as before, and steam-inlet pipes 7 7 are inserted in the tubes $4^b$ instead of in the smaller ones. The tubes $4^a$ are covered with the jackets $6^a$ and the tubes $4^b$ with the jackets $6^b$. This sterilizer is the preferred form, since it may be made of any size, dependent only on the length and number of its tubes, its parts are detachable, and the distribution of steam therefrom is more diversified.

Figure 3:
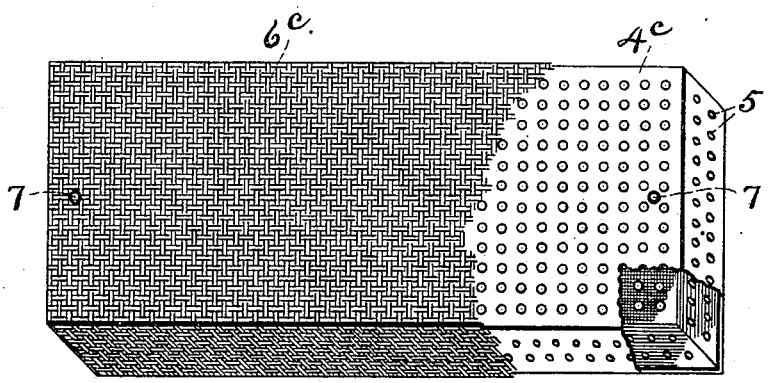

In place of the tubular steam-receptacles 4, $4^a$, and $4^b$ angular receptacles may be used, and the shallow receptacle or box $4^c$ shown in Fig. 3 may be substituted for the sterilizer shown in Fig. 2, said box having the holes 5, the steam-inlet pipes 7 7, and the jacket $6^c$, all equivalents of similar features previously described.

In operation the sterilizer is buried in the soil to be acted upon at the place where the same is to remain, proper steam connections are made, and the steam turned on. The steam enters the receptacle or receptacles through the inlet-pipes and escapes through the receptacle-perforations and the interstices in the jacket, being driven with great force into every part of the surrounding mass of soil. The jacket protects the holes in the receptacle or receptacles, preventing them from becoming clogged with dirt, but offers no material obstruction to the passage of the steam. In fact, the jacket separates the steam into still finer jets, which is an advantage. Soil subjected to the action of steam at a sufficiently high temperature forced through my device for an hour, more or less, becomes thoroughly sterilized to a depth of some two feet, one foot above and another below said device. More or less than two steam-inlet pipes may be employed, and they may be connected with the receptacle or receptacles at any desired points other than those shown. The perforations or holes in the receptacle or receptacles may be greater or less in number than is shown and need not be in all sides or members unless desired.

What I claim as my invention, and desire to secure by Letters Patent, is—

1. A sterilizer for sterilizing soil comprising a perforated steam-receptacle covered with a jacket pervious to steam and substantially impervious to soil.

2. A sterilizer for sterilizing soil, comprising a plurality of steam-receptacles connected with end steam-receptacles, said receptacles being perforated and having jackets, said jackets being pervious to steam and substantially impervious to soil.

3. In combination with a steam-supply, a perforated receptacle for sterilizing soil, covered with a jacket pervious to steam and adapted to protect the receptacle-perforations from soil, substantially as set forth.

4. In combination with a steam-supply, a plurality of receptacles connected with end receptacles, for sterilizing soil, said receptacles being perforated and having jackets, said jackets being pervious to steam and adapted to protect the receptacle-perforations from soil, substantially as set forth.

5. The combination, in a sterilizer for sterilizing soil, of the perforated tubes $4^a$, the perforated connecting end tubes $4^b$, steam-inlet pipes attached to said end tubes, and jackets of fabric covering said tubes, substantially as shown.

RICHARD W. CARTTER.

Witnesses:
DEXTER E. TILLEY,
JACOB R. SACKETT.